(12) United States Patent
Nagashima

(10) Patent No.: US 11,831,205 B2
(45) Date of Patent: Nov. 28, 2023

(54) ROTATING ELECTRIC MACHINE AND ROTOR THEREFOR

(71) Applicant: Mitsubishi Electric Corporation, Tokyo (JP)

(72) Inventor: Takaaki Nagashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 76 days.

(21) Appl. No.: 17/698,304

(22) Filed: Mar. 18, 2022

(65) Prior Publication Data

US 2023/0112371 A1  Apr. 13, 2023

(30) Foreign Application Priority Data

Oct. 11, 2021 (JP) ................................. 2021-166818

(51) Int. Cl.
*H02K 1/27* (2022.01)
*H02K 1/28* (2006.01)
*H02K 1/276* (2022.01)

(52) U.S. Cl.
CPC ............... *H02K 1/276* (2013.01); *H02K 1/28* (2013.01); *H02K 2213/03* (2013.01)

(58) Field of Classification Search
CPC ...... H02K 1/276; H02K 1/28; H02K 2213/03; H02K 1/2766
See application file for complete search history.

(56) References Cited

U.S. PATENT DOCUMENTS

| 7,948,133 | B2 * | 5/2011 | Fu ............................ H02K 1/28 310/156.09 |
| 9,570,947 | B2 | 2/2017 | Nakazono |
| 2010/0013350 | A1 * | 1/2010 | Fu ............................ H02K 1/28 310/216.001 |

FOREIGN PATENT DOCUMENTS

| JP | 5567775 B2 | 5/2010 |
| JP | 2014-072904 A | 4/2014 |
| JP | 6137521 B2 | 4/2014 |
| JP | 2015-220846 A | 12/2015 |

* cited by examiner

*Primary Examiner* — Thomas Truong
(74) *Attorney, Agent, or Firm* — Sughrue Mion, PLLC; Richard C. Turner

(57) ABSTRACT

In a rotor for a rotating electric machine, a key portion, a first stress relaxation groove, a second stress relaxation groove, and a protruding portion are provided at an inner periphery of a rotor core. The first stress relaxation groove is formed to be adjacent to the key portion in a circumferential direction of the rotor core. The protruding portion is formed between the first stress relaxation groove and the second stress relaxation groove, and is in contact with an outer periphery of a shaft.

9 Claims, 8 Drawing Sheets

FIG. 7

|  | MAXIMUM PRINCIPAL STRESS MPa | |
|---|---|---|
|  | FIRST STRESS RELAXATION GROOVE | SECOND STRESS RELAXATION GROOVE |
| COMPARATIVE EXAMPLE | 281.7 |  |
| FIRST EMBODIMENT | 243.3 | 236.8 |
| SECOND EMBODIMENT | 169.4 | 281.3 |
| THIRD EMBODIMENT | 115.5 | 277.2 |
| FOURTH EMBODIMENT | 202.3 | 201.2 |

ROTATING ELECTRIC MACHINE AND ROTOR THEREFOR

BACKGROUND OF THE INVENTION

1. Field of the Invention

This disclosure relates to a rotating electric machine and a rotor therefor.

2. Description of the Related Art

In a related-art rotor for a rotating electric machine, a key portion is formed on an inner periphery of a rotor core. A recessed portion is formed to be adjacent to the key portion (see, for example, Japanese Patent No. 5567775).

In the related-art rotor as described above, the recessed portion is formed to be adjacent to the key portion, to thereby reduce stress generated in the rotor core. However, in order to increase the maximum rotation speed of the rotor, it is required to further reduce the stress generated in the rotor core.

SUMMARY OF THE INVENTION

This disclosure has been made to solve the problem as described above, and has an object to obtain a rotating electric machine and a rotor therefor, which are capable of reducing stress generated in a rotor core.

According to at least one embodiment of this disclosure, there is provided a rotor for a rotating electric machine, including: a rotor main body including: a rotor core having a cylindrical shape with a shaft hole formed at a center of the rotor core; and a plurality of permanent magnets fixed to the rotor core, the rotor main body having a plurality of magnetic poles formed apart from each other in a circumferential direction of the rotor core; and a shaft which is inserted into the shaft hole, and is fixed to the rotor core, wherein a key groove is provided at an outer periphery of the shaft, wherein a key portion, a first stress relaxation groove, a second stress relaxation groove, and a protruding portion are provided at an inner periphery of the rotor core, wherein the key portion is fitted into the key groove, wherein the first stress relaxation groove is formed to be adjacent to the key portion in the circumferential direction of the rotor core, wherein a bottom surface of the first stress relaxation groove in a cross section perpendicular to an axial direction of the rotor core includes one or more first arcs including a first largest arc being an arc having a largest radius, wherein a bottom surface of the second stress relaxation groove in the cross section perpendicular to the axial direction of the rotor core includes one or more second arcs including a second largest arc being an arc having a largest radius, wherein the protruding portion is formed between the first stress relaxation groove and the second stress relaxation groove, and is in contact with the outer periphery of the shaft, and wherein the protruding portion is arranged between two d-axes adjacent to each other in the cross section perpendicular to the axial direction of the rotor core.

According to the rotating electric machine and the rotor therefor of this disclosure, the stress generated in the rotor core can be reduced.

BRIEF DESCRIPTION OF THE DRAWINGS

FIG. 7 is a table for showing an analysis result of maximum principal stress generated in a rotor core in each of the first to fourth embodiment.

DESCRIPTION OF THE EMBODIMENTS

Embodiments are now described with reference to the drawings.

First Embodiment

Figure 1:
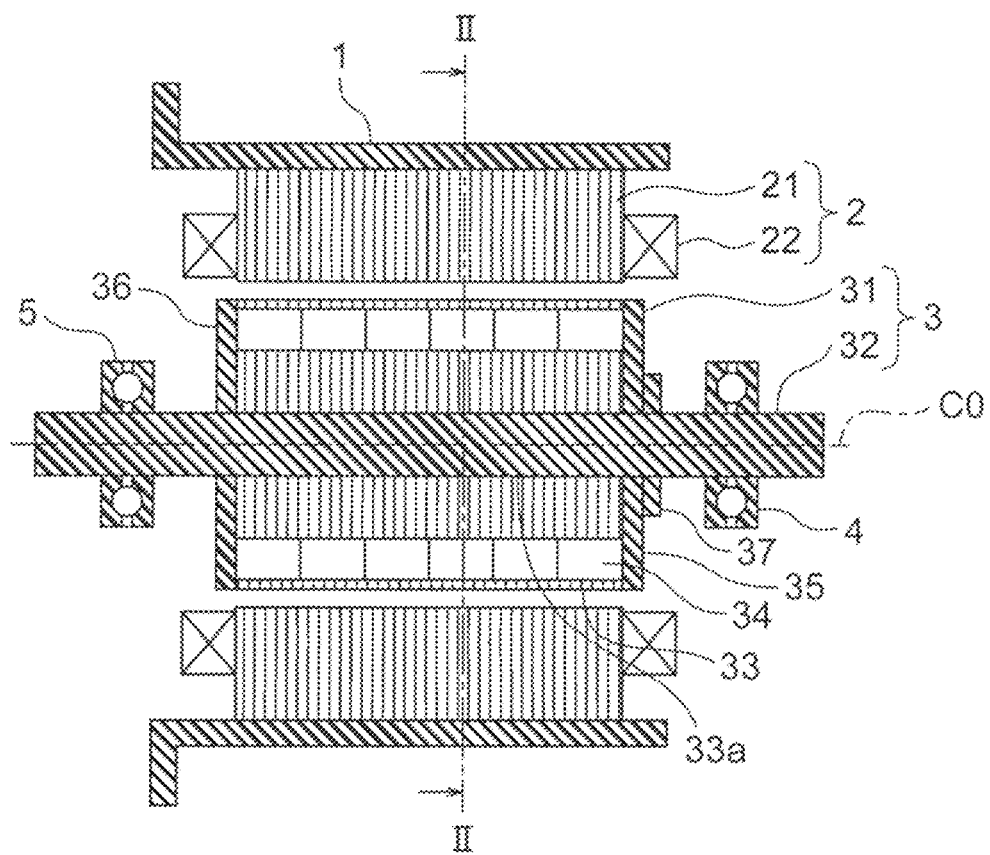
FIG. 1 is a sectional view for schematically illustrating a rotating electric machine according to a first embodiment.

FIG. 1 is a sectional view for schematically illustrating a rotating electric machine according to a first embodiment, and is an illustration of a cross section taken along a rotation center. In FIG. 1, the rotating electric machine includes a frame 1 having a cylindrical shape, a stator 2 having a cylindrical shape, a rotor 3, a first bearing 4, and a second bearing 5.

The stator 2 includes a stator core 21 having a cylindrical shape, and a plurality of stator coils 22. The stator core 21 is held on an inner side of the frame 1. Further, the stator core 21 is formed of a plurality of stator magnetic steel sheets. The plurality of stator magnetic steel sheets are laminated in an axial direction of the stator core 21. The axial direction of the stator core 21 is a direction parallel to a rotation center C0 of the rotor 3, and is a right-and-left direction of FIG. 1.

The rotor 3 is arranged on an inner side of the stator core 21. Further, the rotor 3 includes a rotor main body 31 and a shaft 32.

The rotor main body 31 includes a rotor core 33 having a cylindrical shape, a plurality of permanent magnets 34, a first end plate 35 having a disk shape, and a second end plate 36 having a disk shape.

The rotor core 33 has a shaft hole 33a formed at a center thereof. The shaft 32 is inserted into the shaft hole 33a and is fixed to the rotor core 33. Further, the shaft 32 is fixed to the rotor core 33 by press-fitting or shrink-fitting. Further, the shaft 32 is held by the first bearing 4 and the second bearing 5 so as to be rotatable relative to the frame 1.

The rotor main body 31 rotates together with the shaft 32 about the rotation center C0. Further, the rotor main body 31 is arranged between the first bearing 4 and the second bearing 5.

The rotor core 33 is formed of a plurality of rotor magnetic steel sheets. The plurality of rotor magnetic steel sheets are laminated in an axial direction of the rotor core 33. The axial direction of the rotor core 33 is a direction parallel to the rotation center C0, and is the right-and-left direction of FIG. 1.

An outer peripheral surface of the rotor core 33 is opposed to an inner peripheral surface of the stator core 21 via an air gap.

The plurality of permanent magnets 34 are embedded in the rotor core 33. The first end plate 35 is in contact with a first axial end surface of the rotor core 33. The first axial end surface is an end surface opposed to the first bearing 4. The second end plate 36 is in contact with a second axial end surface of the rotor core 33. The second axial end surface is an end surface opposed to the second bearing 5.

That is, the rotor core 33 is sandwiched between the first end plate 35 and the second end plate 36. With this, scattering of the plurality of permanent magnets 34 from the rotor core 33 is prevented. The shaft 32 passes through the first end plate 35 and the second end plate 36.

In order to adjust a rotation balance, the first end plate 35 or the second end plate 36 may have a balance hole (not shown) formed therein or a balance plate 37 additionally provided thereto.

Figure 2:
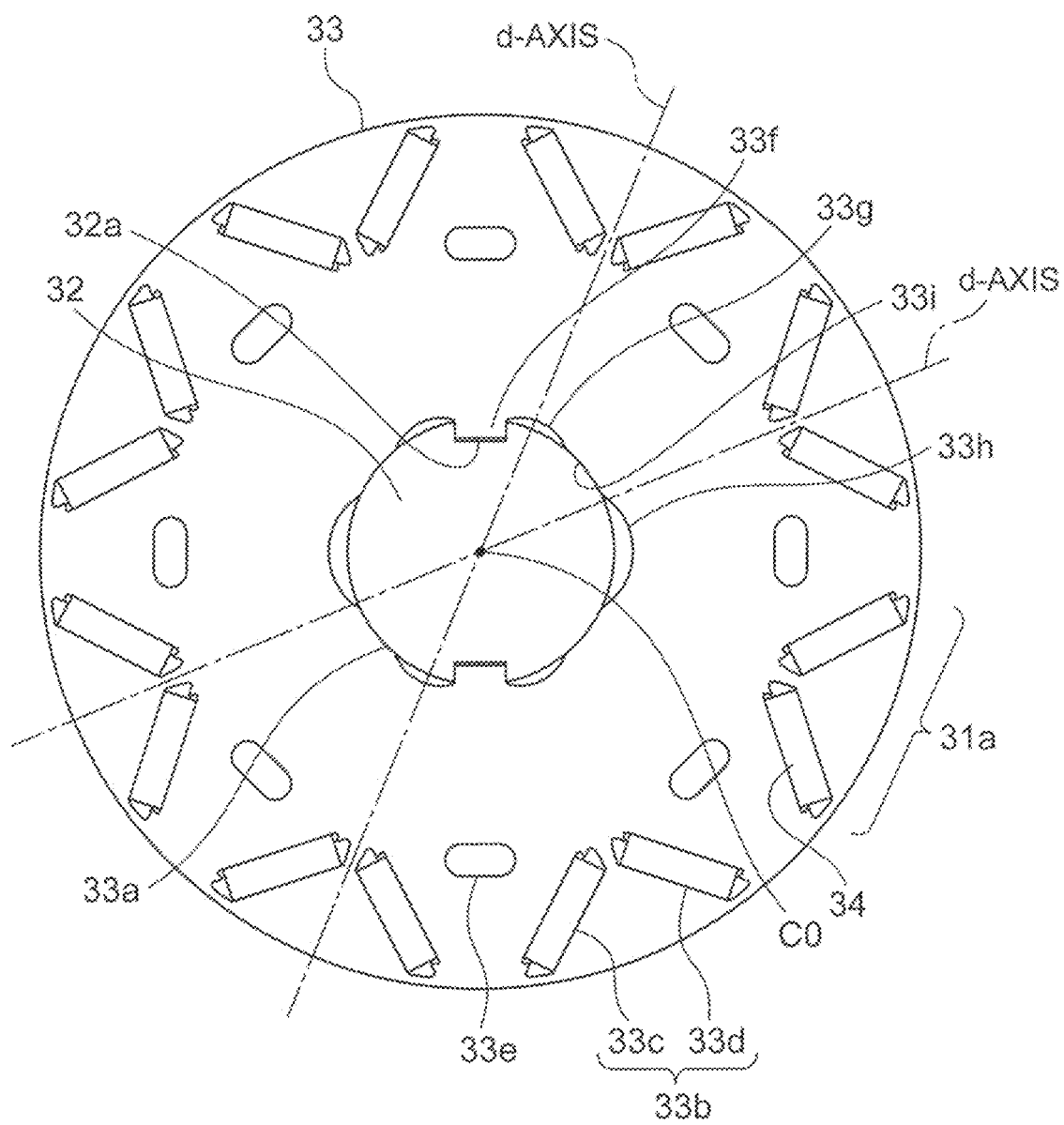
FIG. 2 is a sectional view of a rotor of FIG. 1 taken along the line II-II.

FIG. 2 is a sectional view of the rotor 3 of FIG. 1 taken along the line II-II, and is an illustration of a cross section perpendicular to the axial direction of the rotor core 33. A plurality of magnet mounting portions 33b are formed in the rotor core 33. The plurality of magnet mounting portions 33b are arranged apart from the shaft hole 33a in a radial direction of the rotor core 33. The radial direction of the rotor core 33 is a direction orthogonal to the rotation center C0.

Further, the plurality of magnet mounting portions 33b are arranged at equal intervals in a circumferential direction of the rotor core 33. The circumferential direction of the rotor core 33 is a direction along a circumference about the rotation center C0.

Each of the magnet mounting portions 33b has a first insertion hole 33c and a second insertion hole 33d. When the cross section perpendicular to the axial direction of the rotor core 33 is viewed, the first insertion hole 33c and the second insertion hole 33d of each of the magnet mounting portions 33b are arranged in a V shape opened toward a radially outer side of the rotor core 33.

The plurality of permanent magnets 34 are inserted into the first insertion hole 33c and the second insertion hole 33d of each of the magnet mounting portions 33b, respectively, so as to be arranged in the axial direction of the rotor core 33. Each of the first insertion holes 33c and the second insertion holes 33d is formed continuously over the entirety of the rotor core 33 in the axial direction.

A plurality of magnetic poles 31a are formed in the rotor main body 31. The plurality of magnetic poles 31a are arranged at equal intervals in the circumferential direction of the rotor core 33. In FIG. 2, eight magnetic poles 31a are formed along the outer periphery of the rotor main body 31. Each of the magnetic poles 31a includes one magnet mounting portion 33b, and the plurality of permanent magnets 34 mounted to the magnet mounting portion 33b.

The rotor core 33 has a plurality of weight reduction holes 33e. Each of the weight reduction holes 33e is provided between two magnet mounting portions 33b adjacent to each other in the circumferential direction of the rotor core 33. Further, each of the weight reduction holes 33e is formed continuously over the entirety of the rotor core 33 in the axial direction.

Each of the weight reduction holes 33e has a function of reducing the weight of the rotor core 33. Further, each of the weight reduction holes 33e may have a function of adjusting the rotation balance of the rotor 3.

A pair of key grooves 32a are provided at the outer periphery of the shaft 32. Each of the key grooves 32a has a straight shape parallel to the rotation center C0. The pair of key grooves 32a are arranged so as to be apart from each other by 180° in the circumferential direction of the rotor core 33.

A pair of key portions 33f are provided at an inner periphery of the rotor core 33. The pair of key portions 33f are located at positions apart from each other by 180° in the circumferential direction of the rotor core 33, and are opposed to each other.

Each of the key portions 33f protrudes from the inner periphery of the rotor core 33 to the radially inner side, and is fitted into a corresponding one of the key grooves 32a.

Two pairs of first stress relaxation grooves 33g are provided at the inner periphery of the rotor core 33. The first stress relaxation grooves 33g of each pair are formed on both sides of a corresponding one of the key portions 33f. That is, each of the first stress relaxation grooves 33g is formed to be adjacent to the key portion 33f in the circumferential direction of the rotor core 33.

Each of the first stress relaxation grooves 33g is a straight groove along the axial direction of the rotor core 33. A bottom surface of the first stress relaxation groove 33g in the cross section perpendicular to the axial direction of the rotor core 33 includes one or more first arcs. Further, one or more first arcs include a first largest arc. The first largest arc is an arc having the largest radius among one or more first arcs.

The two pairs of first stress relaxation grooves 33g prevent generation of stress concentration in the pair of key portions 33f during rotation of the rotor 3.

A pair of second stress relaxation grooves 33h are provided at the inner periphery of the rotor core 33. The pair of second stress relaxation grooves 33h are located at positions apart from each other by 180° in the circumferential direction of the rotor core 33, and are opposed to each other. Further, the pair of second stress relaxation grooves 33h are located at positions apart from the pair of key portions 33f by 90° in the circumferential direction of the rotor core 33.

Each of the second stress relaxation grooves 33h is a straight groove along the axial direction of the rotor core 33. The bottom surface of the second stress relaxation groove 33h in the cross section perpendicular to the axial direction of the rotor core 33 includes one or more second arcs. Further, one or more second arcs include a second largest arc. The second largest arc is an arc having the largest radius among one or more second arcs.

Two pairs of protruding portions 33i are provided at the inner periphery of the rotor core 33. The protruding portions 33i of each pair are formed on both sides of a corresponding one of the second stress relaxation grooves 33h. Each of the protruding portions 33i is formed between the first stress relaxation groove 33g and the second stress relaxation groove 33h. Further, each of the protruding portions 33i is in contact with the outer periphery of the shaft 32.

Further, in the cross section perpendicular to the axial direction of the rotor core 33, each of the protruding portions 33i is located between two d-axes adjacent to each other. That is, each of the protruding portions 33i is located at a position that does not overlap any of the d-axes. Each of the d-axes is a straight line connecting the center of the magnetic pole 31a and the center C0 of the shaft 32 to each other.

In the cross section perpendicular to the axial direction of the rotor core 33, the center of the shaft 32 is the same as the rotation center C0. Thus, the center of the shaft 32 is also denoted by "C0".

Figure 3:
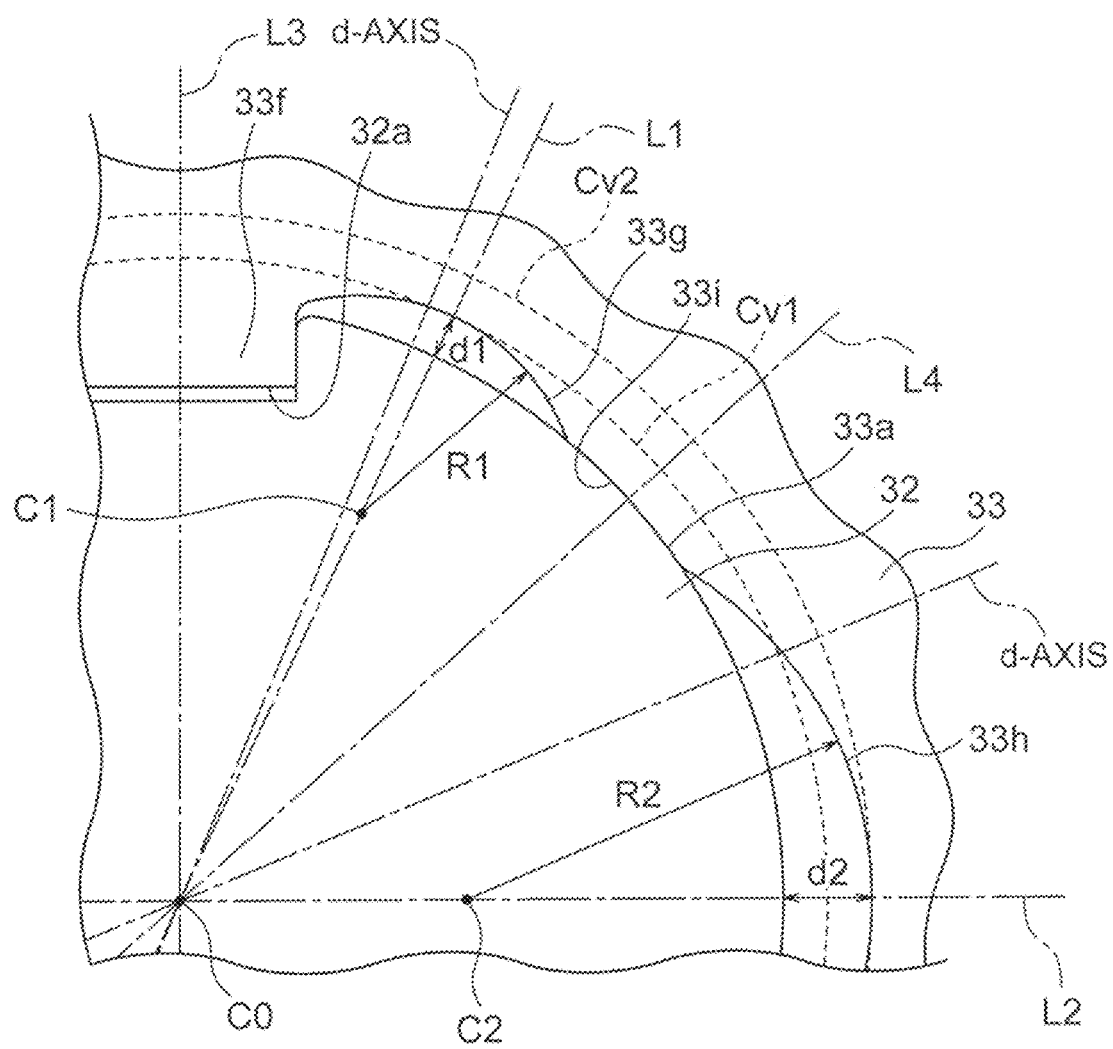
FIG. 3 is an enlarged sectional view for illustrating a part of FIG. 2.

FIG. 3 is an enlarged sectional view for illustrating a part of FIG. 2. In FIG. 3, the bottom surface of the second stress relaxation groove 33h includes only one second arc, that is, only the second largest arc. However, the bottom surface of the second stress relaxation groove 33h may include a plurality of second arcs. In this case, the plurality of second arcs are smoothly connected to each other in the circumferential direction of the rotor core 33.

When the cross section perpendicular to the axial direction of the rotor core 33 is viewed, the center of each of the protruding portions 33i is located on a straight line L4 bisecting an angle formed by a key straight line L3 and a second groove straight line L2. The key straight line L3 is a straight line passing through the center of the key portion 33f and the center C0 of the rotor core 33. The second groove straight line L2 is a straight line passing through the center C0 of the rotor core 33 and a center C2 of a circle along the second largest arc.

When the cross section perpendicular to the axial direction of the rotor core 33 is viewed, the center C2 of the circle along each second largest arc is located at a position apart from the center of each key portion 33f by 90° in the circumferential direction of the rotor core 33. The four protruding portions 33i are arranged for every 90° in the circumferential direction of the rotor core 33.

In the first embodiment, the pair of key portions 33f are located at positions apart from each other by 180°. Thus, the second groove straight line L2 is a straight line connecting the center C0 of the rotor core 33 and the center on an arc, which connects the center of one key portion 33f and the center of the other key portion 33f to each other with the center C0 as the center, to each other.

In FIG. 3, d1 is a largest distance between the bottom surface of the first stress relaxation groove 33g and the outer periphery of the shaft 32 in the radial direction of the rotor core 33. Similarly, d2 is a largest distance between the bottom surface of the second stress relaxation groove 33h and the outer periphery of the shaft 32 in the radial direction of the rotor core 33.

R1 is a radius of a circle along the first largest arc. R2 is a radius of a circle along the second largest arc. C1 is the center of a circle along the first largest arc. L1 is a first groove straight line, that is, a straight line passing through the center C0 of the rotor core 33 and the center C1 of the circle along the first largest arc.

Further, a first virtual circle Cv1 is a circle having the center C0 of the rotor core 33 as a center and circumscribing all the first stress relaxation grooves 33g. A second virtual circle Cv2 is a circle having the center C0 of the rotor core 33 as a center and circumscribing all the second stress relaxation grooves 33h.

In the rotating electric machine and the rotor 3 therefor as described above, the pair of second stress relaxation grooves 33h are formed in the inner periphery of the rotor core 33. Further, each of the protruding portions 33i is formed between the first stress relaxation groove 33g and the second stress relaxation groove 33h. Further, each of the protruding portions 33i is located between the two d-axes adjacent to each other.

Thus, stress generated in the rotor core 33, in particular, stress generated in the inner periphery of the rotor core 33 can be reduced. With this, the durability of the rotor core 33 can be improved. Further, the maximum rotation speed of the rotor 3 can be increased.

Further, each of the protruding portions 33i is arranged at a position that does not overlap the d-axis, that is, arranged so as to avoid the center of the magnetic pole 31a. Thus, an increase in the stress generated around each of the magnetic poles 31a due to press-fitting of the shaft 32 into the rotor core 33 can be suppressed. With this, a reduction in fatigue life of the rotor core 33 can be suppressed.

Further, the center C2 of the circle along each of the second largest arcs is located at a position apart from the center of each of the key portions 33f by 90° in the circumferential direction of the rotor core 33. Thus, a deformation amount of the rotor core 33 can be further uniformized. With this, the air gap between the stator core 21 and the rotor core 33 can be further uniformized, thereby being capable of improving the reliability and the durability of the rotor core 33.

Further, the pair of second stress relaxation grooves 33h are located at positions apart from the pair of key portions 33f by 90° in the circumferential direction of the rotor core 33. Thus, a plurality of regions in the inner periphery of the rotor core 33 that are in close contact with the outer periphery of the shaft 32 are arranged evenly in the circumferential direction of the rotor core 33. With this, deformation of the rotor core 33 into an elliptical shape can be suppressed when the shaft 32 is inserted into the shaft hole 33a, thereby being capable of improving the reliability and the durability of the rotor 3.

Further, the center of each of the protruding portions 33i is located on the straight line L4 bisecting the angle formed by the key straight line L3 and the second groove straight line L2. Thus, the deformation amount of the rotor core 33 can be further uniformized. With this, the air gap between the stator core 21 and the rotor core 33 can be further uniformized, thereby being capable of improving the reliability and the durability of the rotor core 33.

Second Embodiment

Figure 4:
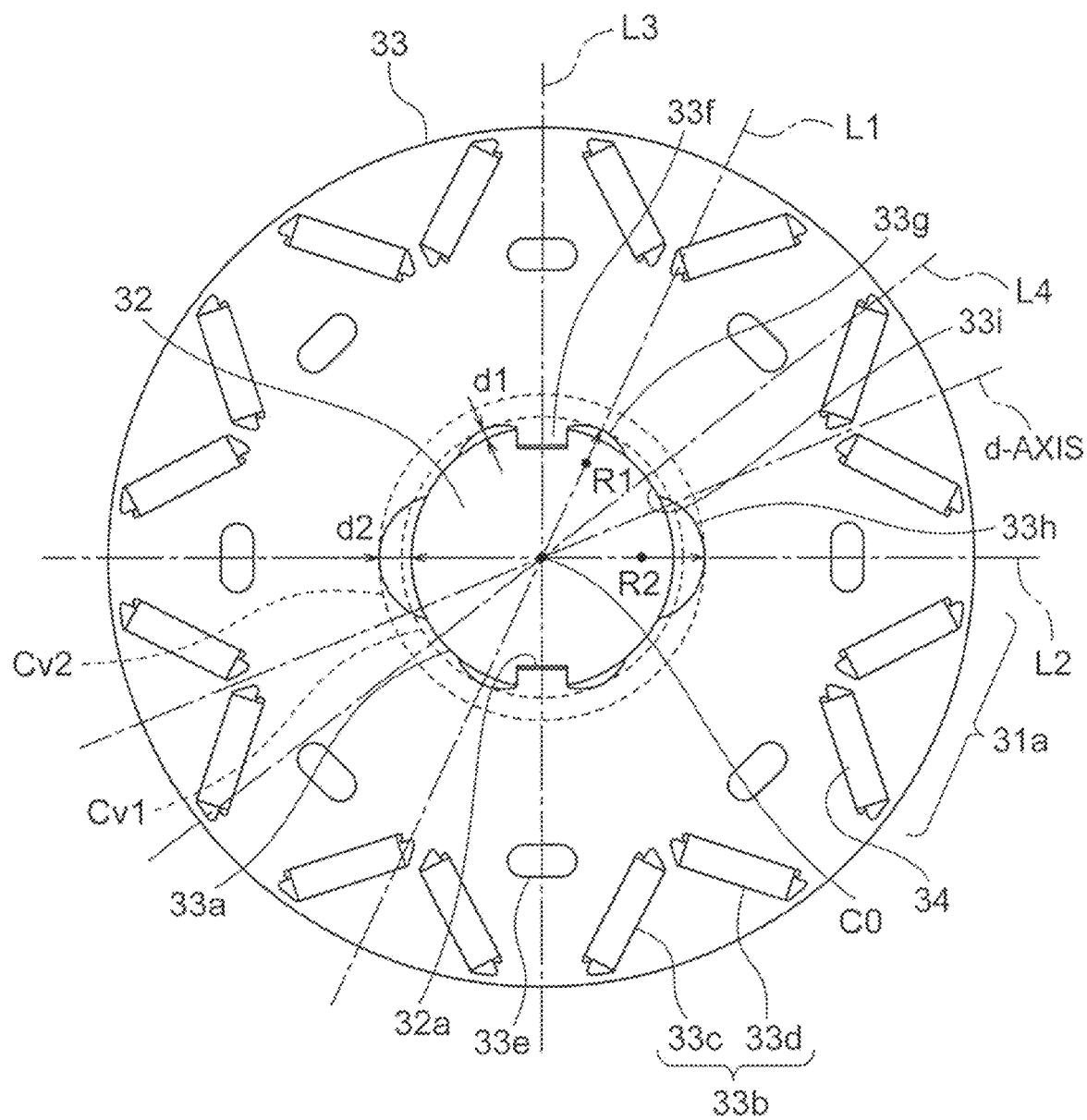
FIG. 4 is a sectional view of a rotor according to a second embodiment.

Next, FIG. 4 is a sectional view of a rotor 3 according to a second embodiment, and is an illustration of a cross section corresponding to the cross section taken along the line II-II of FIG. 1. In the second embodiment, when the cross section perpendicular to the axial direction of the rotor core 33 is viewed, a relationship of $d2 \leq 3 \times d1 \times (R2/R1)$ is satisfied. In particular, in FIG. 4, a relationship of $d2/d1=3 \times (R2/R1)$ is satisfied. Further, R2/R1 is 1.3.

The definitions of d1, d2, R1, and R2 are the same as the definitions thereof in FIG. 3. Further, the configuration of the rotating electric machine is the same as that of the first embodiment except for the configuration illustrated in FIG. 4.

With such a configuration, the stress generated in the inner periphery of the rotor core 33 can be reduced more reliably, thereby being capable of further improving the durability of the rotor core 33.

Third Embodiment

Figure 5:
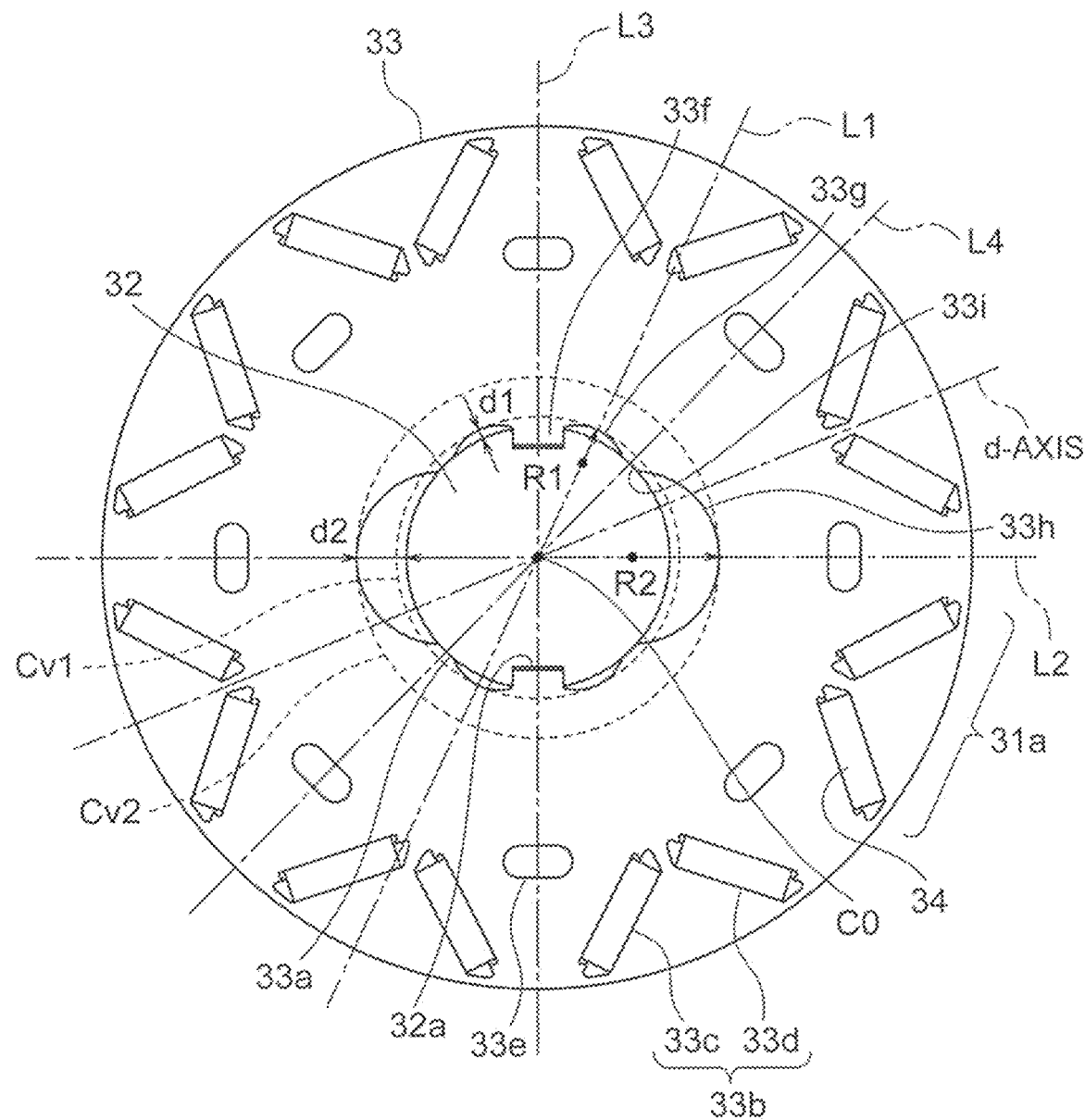
FIG. 5 is a sectional view of a rotor according to a third embodiment.

Next, FIG. 5 is a sectional view of a rotor 3 according to a third embodiment, and is an illustration of a cross section corresponding to the cross section taken along the line II-II in FIG. 1. Also in the third embodiment, when the cross section perpendicular to the axial direction of the rotor core 33 is viewed, a relationship of $d2/d1=3 \times (R2/R1)$ is satisfied. However, R2/R1 is 1.8.

The definitions of d1, d2, R1, and R2 are the same as the definitions thereof in FIG. 3. Further, the configuration of the rotating electric machine is the same as that of the first embodiment except for the configuration illustrated in FIG. 5.

With such a configuration, the stress generated in the inner periphery of the rotor core 33 can be reduced more reliably, thereby being capable of further improving the durability of the rotor core 33.

Fourth Embodiment

Figure 6:
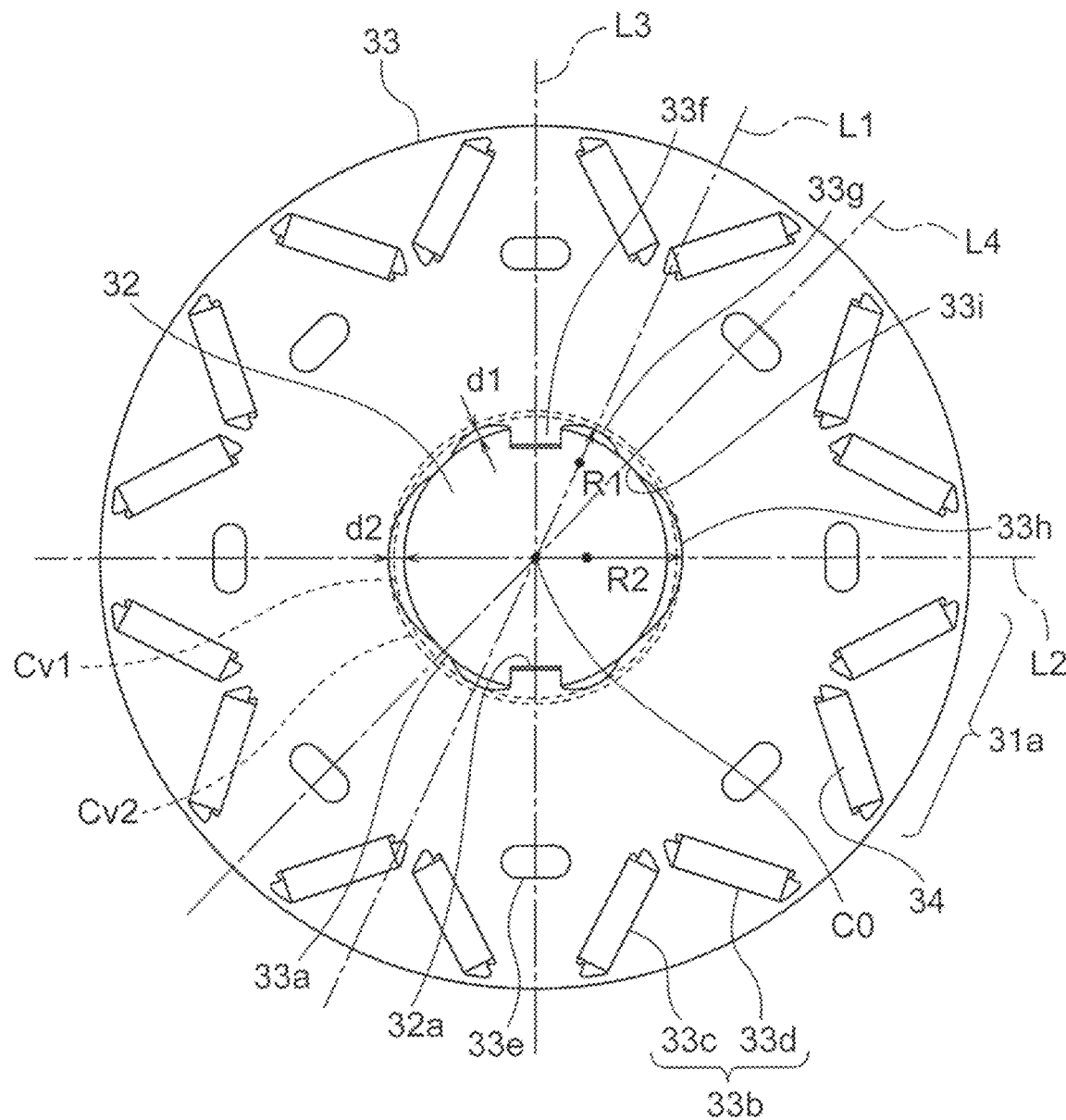
FIG. 6 is a sectional view of a rotor according to a fourth embodiment.

Next, FIG. 6 is a sectional view of a rotor 3 according to a fourth embodiment, and is an illustration of a cross section corresponding to the cross section taken along the line II-II in FIG. 1. In the fourth embodiment, the radius R2 of the circle along the second largest arc is larger than the radius R2 in the first to third embodiments. Further, d2/d1 is smaller than d2/d1 in the first to third embodiments.

The definitions of d1, d2, and R2 are the same as the definitions thereof in FIG. 3. Further, the configuration of the rotating electric machine is the same as that of the first embodiment except for the configuration illustrated in FIG. 6.

Even with such a configuration, the same effects as those of the first embodiment can be obtained.

Here, FIG. 7 is a table for showing an analysis result of maximum principal stress generated in the rotor core 33 in each of the first to fourth embodiments. In FIG. 7, in the column of "FIRST STRESS RELAXATION GROOVE", maximum principal stress generated in an edge portion of the first stress relaxation groove 33g is shown. In the column of "SECOND STRESS RELAXATION GROOVE", maximum principal stress generated in an edge portion of the second stress relaxation groove 33h is shown.

Further, "COMPARATIVE EXAMPLE" corresponds to a rotor core similar to the rotor core 33 in the first embodiment except that the pair of second stress relaxation grooves 33h are not formed.

Further, each maximum principal stress is maximum principal stress generated when the shaft 32 is press-fitted into the rotor core 33 and a centrifugal force generated by the rotation is applied to the rotor core 33.

As shown in FIG. 7, the maximum principal stress generated in the edge portion of the first stress relaxation groove 33g in each of the first to fourth embodiments is smaller than the maximum principal stress generated in the edge portion of the first stress relaxation groove 33g in the comparative example.

Further, the maximum principal stress generated in the edge portion of the second stress relaxation groove 33h in the first embodiment is smaller than the maximum principal stress generated in the edge portion of the first stress relaxation groove 33g in the comparative example.

Further, the maximum principal stress generated in the edge portion of the first stress relaxation groove 33g in the second embodiment is sufficiently smaller than the maximum principal stress generated in the edge portion of the first stress relaxation groove 33g in the comparative example. However, the maximum principal stress generated in the edge portion of the second stress relaxation groove 33h in the second embodiment is slightly smaller than the maximum principal stress generated in the edge portion of the first stress relaxation groove 33g in the comparative example.

Further, the maximum principal stress generated in the edge portion of the first stress relaxation groove 33g in the third embodiment is sufficiently smaller than the maximum principal stress generated in the edge portion of the first stress relaxation groove 33g in the comparative example. However, the maximum principal stress generated in the edge portion of the second stress relaxation groove 33h in the third embodiment is slightly smaller than the maximum principal stress generated in the edge portion of the first stress relaxation groove 33g in the comparative example.

As is understood by the analysis results of the second and third embodiments, it is only required that dimensions of the first stress relaxation groove 33g and the second stress relaxation groove 33h be appropriately selected within a range in which the relationship of $d2 \leq 3 \times d1 \times (R2/R1)$ is satisfied.

The maximum principal stress generated in the edge portion of the first stress relaxation groove 33g in the fourth embodiment is smaller than the maximum principal stress generated in the edge portion of the first stress relaxation groove 33g in the first embodiment. Further, the maximum principal stress generated in the edge portion of the second stress relaxation groove 33h in the fourth embodiment is smaller than the maximum principal stress generated in the edge portion of the second stress relaxation groove 33h in the first embodiment.

Figure 8:
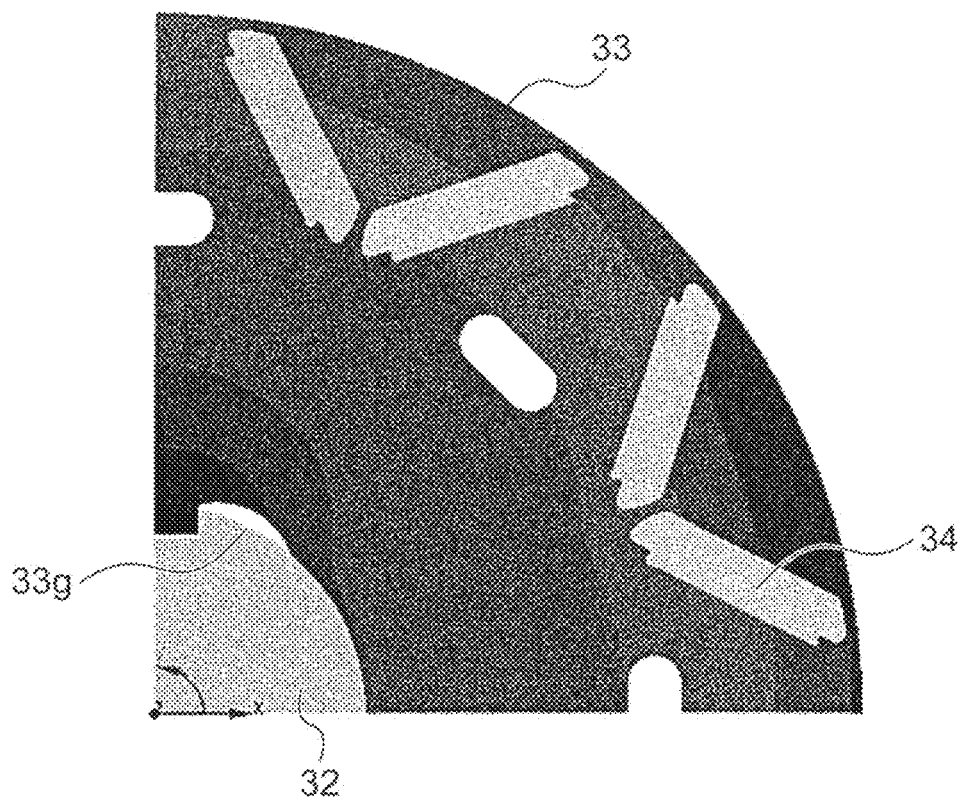
FIG. 8 is a contour diagram of a deformation amount of a rotor core in a comparative example of FIG. 7 when a centrifugal force is applied to the rotor core.
Figure 9:
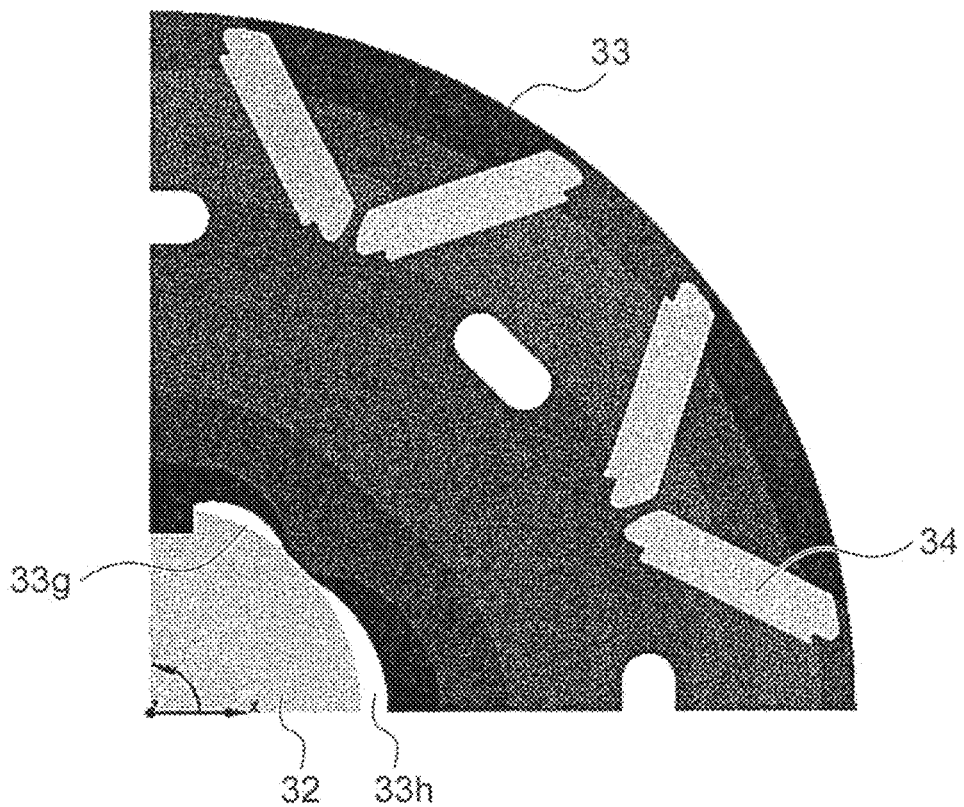
FIG. 9 is a contour diagram of a deformation amount of the rotor core in the fourth embodiment when a centrifugal force is applied to the rotor core.

Next, an analysis result of a deformation amount of the rotor core 33 in the radial direction is described. FIG. 8 is a contour diagram of a deformation amount of a rotor core in the comparative example of FIG. 7 when a centrifugal force due to rotation is applied to the rotor core. FIG. 9 is a contour diagram of a deformation amount of the rotor core 33 in the fourth embodiment when a centrifugal force due to rotation is applied to the rotor core 33.

In FIG. 8, a distribution of the same colored line is an elliptical shape. From this, it is understood that the rotor core 33 in which the pair of second stress relaxation grooves 33h are not formed is deformed into an elliptical shape. In contrast, in FIG. 9, a distribution of the same colored line is a shape close to a circle. From this, it is understood that the deformation into an elliptical shape is suppressed in the rotor core 33 in the fourth embodiment.

The number of the key portions 33f, the number of the first stress relaxation grooves 33g, the number of the second stress relaxation grooves 33h, and the number of the protruding portions 33i are not necessarily limited to the examples described above.

What is claimed is:

1. A rotor for a rotating electric machine, comprising:
   a rotor main body including:
     a rotor core having a cylindrical shape with a shaft hole formed at a center of the rotor core; and
     a plurality of permanent magnets fixed to the rotor core, the rotor main body having a plurality of magnetic poles formed apart from each other in a circumferential direction of the rotor core; and
   a shaft which is inserted into the shaft hole, and is fixed to the rotor core,
   wherein a key groove is provided at an outer periphery of the shaft,
   wherein a key portion, a first stress relaxation groove, a second stress relaxation groove, and a protruding portion are provided at an inner periphery of the rotor core,
   wherein the key portion is fitted into the key groove,
   wherein the first stress relaxation groove is formed to be adjacent to the key portion in the circumferential direction of the rotor core,
   wherein a bottom surface of the first stress relaxation groove in a cross section perpendicular to an axial direction of the rotor core includes one or more first arcs including a first largest arc being an arc having a largest radius,
   wherein a bottom surface of the second stress relaxation groove in the cross section perpendicular to the axial direction of the rotor core includes one or more second arcs including a second largest arc being an arc having a largest radius, wherein the protruding portion is formed between the first stress relaxation groove and the second stress relaxation groove, and is in contact with the outer periphery of the shaft, and wherein the protruding portion is arranged between two d-axes adjacent to each other in the cross section perpendicular to the axial direction of the rotor core.

2. The rotor for a rotating electric machine according to claim 1, wherein, when the cross section perpendicular to the axial direction of the rotor core is viewed, a center of a circle along the second largest arc is located at a position apart from a center of the key portion by 90° in the circumferential direction of the rotor core.

3. The rotor for a rotating electric machine according to claim 2, wherein, when the cross section perpendicular to the axial direction of the rotor core is viewed, a center of the protruding portion is located on a straight line bisecting an angle formed by a key straight line and a second groove straight line, wherein the key straight line is a straight line passing through the center of the rotor core and the center of the key portion, and wherein the second groove straight line is a straight line passing through the center of the rotor core and the center of the circle along the second largest arc.

4. The rotor for a rotating electric machine according to claim 3, wherein, when the cross section perpendicular to the axial direction of the rotor core is viewed, a relationship of $d2 \leq 3 \times d1 \times (R2/R1)$ is satisfied, where d1 a largest distance between the bottom surface of the first stress relaxation groove and the outer periphery of the shaft in a radial direction of the rotor core, d2 is a largest distance between the bottom surface of the second stress relaxation groove and the outer periphery of the shaft in the radial direction of the rotor core, R1 is a radius of a circle along the first largest arc, and R2 is a radius of the circle along the second largest arc.

5. The rotor for a rotating electric machine according to claim 2, wherein, when the cross section perpendicular to the axial direction of the rotor core is viewed, a relationship of $d2 \leq 3 \times d1 \times (R2/R1)$ is satisfied, where d1 is a largest distance between the bottom surface of the first stress relaxation groove and the outer periphery of the shaft in a radial direction of the rotor core, d2 is a largest distance between the bottom surface of the second stress relaxation groove and the outer periphery of the shaft in the radial direction of the rotor core, R1 is a radius of a circle along the first largest arc, and R2 is a radius of the circle along the second largest arc.

6. The rotor for a rotating electric machine according to claim 1, wherein, when the cross section perpendicular to the axial direction of the rotor core is viewed, a center of the protruding portion is located on a straight line bisecting an angle formed by a key straight line and a second groove straight line, wherein the key straight line is a straight line passing through the center of the rotor core and a center of the key portion, and wherein the second groove straight line is a straight line passing through the center of the rotor core and a center of a circle along the second largest arc.

7. The rotor for a rotating electric machine according to claim 6, wherein, when the cross section perpendicular to the axial direction of the rotor core is viewed, a relationship of $d2 \leq 3 \times d1 \times (R2/R1)$ is satisfied, where d1 a largest distance between the bottom surface of the first stress relaxation groove and the outer periphery of the shaft in a radial direction of the rotor core, d2 is a largest distance between the bottom surface of the second stress relaxation groove and the outer periphery of the shaft in the radial direction of the rotor core, R1 is a radius of a circle along the first largest arc, and R2 is a radius of the circle along the second largest arc.

8. The rotor for a rotating electric machine according to claim 1, wherein, when the cross section perpendicular to the axial direction of the rotor core is viewed, a relationship of $d2 \leq 3 \times d1 \times (R2/R1)$ is satisfied, where d1 is a largest distance between the bottom surface of the first stress relaxation groove and the outer periphery of the shaft in a radial direction of the rotor core, d2 is a largest distance between the bottom surface of the second stress relaxation groove and the outer periphery of the shaft in the radial direction of the rotor core, R1 is a radius of a circle along the first largest arc, and R2 is a radius of a circle along the second largest arc.

9. A rotating electric machine, comprising the rotor of claim 1.

* * * * *